(12) United States Patent
Bock et al.

(10) Patent No.: US 10,671,100 B2
(45) Date of Patent: Jun. 2, 2020

(54) UNIT FOR THE REGULATION OR CONTROL OF A FLUID PRESSURE

(71) Applicant: MANN+HUMMEL GmbH, Ludwigsburg OT (DE)

(72) Inventors: Lukas Bock, Bietigheim-Bissingen (DE); Volker Kuemmerling, Bietigheim-Bissingen (DE); Thomas Jessberger, Asperg (DE); Hoang-Minh Vu, Darmstadt (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 60 days.

(21) Appl. No.: 15/800,712

(22) Filed: Nov. 1, 2017

(65) Prior Publication Data
US 2018/0120868 A1 May 3, 2018

(30) Foreign Application Priority Data

Nov. 2, 2016 (DE) .......... 10 2016 013 012

(51) Int. Cl.
*G05D 16/06* (2006.01)
*B23K 26/324* (2014.01)
(Continued)

(52) U.S. Cl.
CPC ......... *G05D 16/0633* (2013.01); *B23K 20/10* (2013.01); *B23K 20/233* (2013.01);
(Continued)

(58) Field of Classification Search
CPC ............. G05D 16/0633; G05D 16/064; G05D 16/0661; B23K 20/10; B23K 20/22;
(Continued)

(56) References Cited

U.S. PATENT DOCUMENTS 2,394,911 A * 2/1946 Griswold ................ E03C 1/108
137/217
3,411,522 A * 11/1968 Golden .............. G05D 16/0641
137/116.5
(Continued)

FOREIGN PATENT DOCUMENTS

DE 1421380 U 7/1937
DE 1196032 B 7/1965
(Continued)

OTHER PUBLICATIONS

Machine Translation of JP2008121703A from espacenet.com retrieved 2019. (Year: 2019).*

(Continued)

*Primary Examiner* — Jessica Cahill
(74) *Attorney, Agent, or Firm* — James Hasselbeck

(57) ABSTRACT

A unit (10) for the regulation or control of a fluid pressure, having at least one housing section (13, 14) and a switching film (22) connected to the at least one housing section (13, 14) for switching at pressure differentials relative to an ambient pressure acting on the switching film (22), and for the regulation, release or blocking of a flow of the fluid between an inlet (28) and a discharge (30) for the fluid. The switching film (22) is made out of a polymer material having fluorine and carbon, in particular a thermoplastic having fluorine and carbon. In this arrangement, a hole cross-section (40) of the at least one housing section (13, 14) is closed off by the switching film (22).

10 Claims, 8 Drawing Sheets

(51) Int. Cl.
*B29C 65/00* (2006.01)
*B23K 26/282* (2014.01)
*B23K 20/10* (2006.01)
*B23K 20/233* (2006.01)
*B23K 26/323* (2014.01)
*B29C 65/02* (2006.01)
*B29C 65/78* (2006.01)
*B23K 26/24* (2014.01)
*B23P 15/00* (2006.01)
*F01M 13/02* (2006.01)
*B29C 65/16* (2006.01)
*B29C 65/08* (2006.01)
*B29C 65/20* (2006.01)
*B23K 103/00* (2006.01)
*F01M 13/00* (2006.01)

(52) U.S. Cl.
CPC ............ *B23K 26/24* (2013.01); *B23K 26/282* (2015.10); *B23K 26/323* (2015.10); *B23K 26/324* (2013.01); *B23P 15/001* (2013.01); *B29C 65/02* (2013.01); *B29C 65/7829* (2013.01); *B29C 66/1312* (2013.01); *B29C 66/30223* (2013.01); *B29C 66/322* (2013.01); *B29C 66/542* (2013.01); *B29C 66/5412* (2013.01); *B29C 66/71* (2013.01); *F01M 13/023* (2013.01); *G05D 16/0641* (2013.01); *G05D 16/0661* (2013.01); *B23K 2103/42* (2018.08); *B29C 65/08* (2013.01); *B29C 65/16* (2013.01); *B29C 65/20* (2013.01); *B29C 66/7212* (2013.01); *F01M 2013/0016* (2013.01)

(58) Field of Classification Search
CPC ................ B23K 31/02; B23K 2103/18; B23K 2103/42; B23P 15/001; B29C 65/16; F01M 13/023; F01M 13/0016; Y10T 137/7822; Y10T 137/782
See application file for complete search history.

(56) References Cited

U.S. PATENT DOCUMENTS

| | | | | |
|---|---|---|---|---|
| 4,646,700 A | * | 3/1987 | Tuckey | F02M 69/54 123/510 |
| 5,076,322 A | * | 12/1991 | Choksi | A61M 1/0031 137/505.13 |
| 5,217,797 A | * | 6/1993 | Knox | B29C 70/086 428/167 |
| 5,335,641 A | * | 8/1994 | Schnabel | F01M 11/04 123/574 |
| 6,363,958 B1 | * | 4/2002 | Ollivier | G05D 7/0647 137/2 |
| 6,505,814 B1 | * | 1/2003 | Satou | F16K 7/123 137/863 |
| 6,874,484 B2 | * | 4/2005 | Benjey | B60K 15/03519 123/520 |
| 7,500,491 B2 | * | 3/2009 | Welch | G05D 16/0658 137/505.41 |
| 8,227,521 B2 | * | 7/2012 | Jacobs | B29B 13/08 264/239 |
| 2003/0216119 A1 | | 11/2003 | Mashiko et al. | |
| 2005/0202230 A1 | * | 9/2005 | Jackson | F16J 15/022 428/304.4 |
| 2006/0037975 A1 | | 2/2006 | Suffa | |
| 2006/0090737 A1 | * | 5/2006 | Pietschner | F01M 13/04 123/572 |
| 2010/0221995 A1 | * | 9/2010 | Furuyama | B29C 65/08 454/284 |
| 2012/0248364 A1 | | 10/2012 | Baumann et al. | |
| 2016/0076537 A1 | | 3/2016 | Kawamura et al. | |
| 2016/0123497 A1 | * | 5/2016 | Shinohara | G01N 27/20 137/551 |
| 2017/0102089 A1 | * | 4/2017 | Griffin, Jr. | B33Y 30/00 |
| 2017/0326692 A1 | * | 11/2017 | Lai | B23P 15/001 |

FOREIGN PATENT DOCUMENTS

| | | | |
|---|---|---|---|
| DE | 2063340 A1 | 6/1972 | |
| DE | 19821324 A1 | 12/1999 | |
| DE | 202004015872 U1 | 2/2006 | |
| DE | 202005012403 U1 | 12/2006 | |
| DE | 102007031652 A1 | 1/2008 | |
| DE | 102013005624 A1 | 10/2013 | |
| DE | 102015102545 A1 | 8/2016 | |
| DE | 102015005692 A1 | 11/2016 | |
| EP | 2377598 A1 | 10/2011 | |
| GB | 1579160 A | 11/1980 | |
| JP | 2008121703 A | * 5/2008 | |
| WO | 0045446 A2 | 8/2000 | |
| WO | 0045446 A3 | 12/2000 | |
| WO | WO-2007017033 A1 | * 2/2007 | ......... F01M 13/0011 |

OTHER PUBLICATIONS

Machine Translation of WO2007017033A1 from espacenet.com retrieved 2019. (Year: 2019).*

* cited by examiner

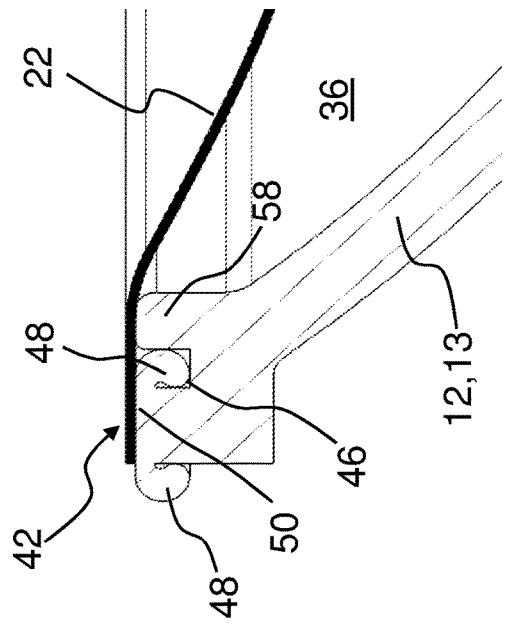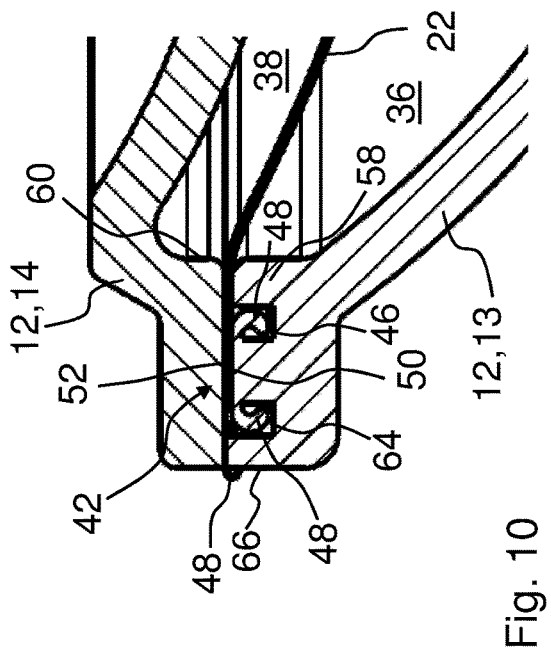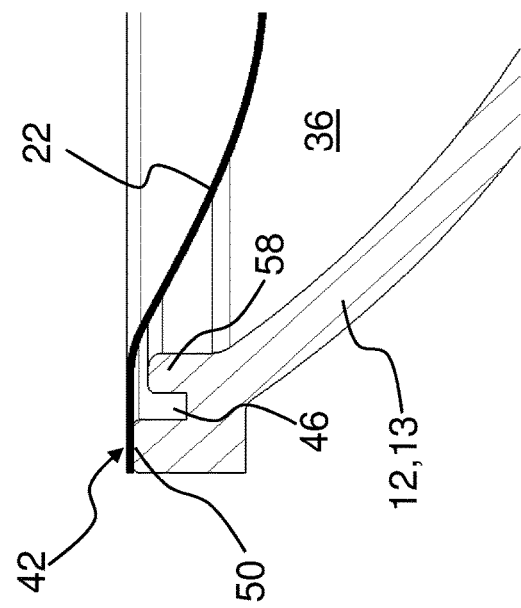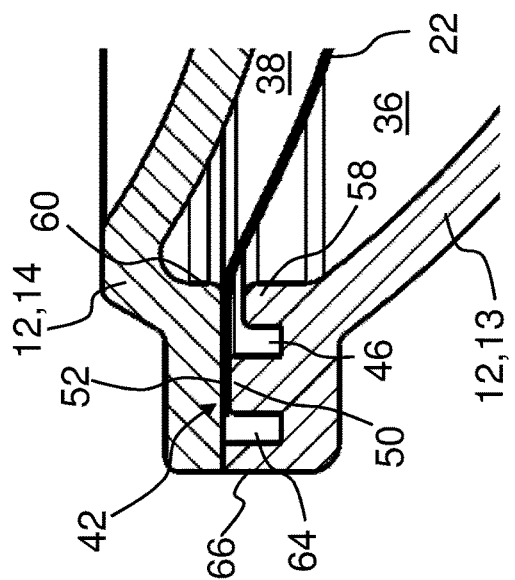

UNIT FOR THE REGULATION OR CONTROL OF A FLUID PRESSURE

TECHNICAL FIELD

The invention relates to a unit for the regulation or control of a fluid pressure, in particular for the pressure regulation of an internal combustion engine and/or of the crankcase of the internal combustion engine of a motor vehicle and a method for fluid-tight connection of a switching film to at least one housing section of the unit.

BACKGROUND

Pressure regulating valves are used, for example, in the breather line between crankcase and the intake manifold of an internal combustion engine. This involves not allowing the pressure or vacuum in the receptacles to be vented to increase beyond a predetermined value.

In internal combustion engines, blow-by gases occur that are produced by combustion gases in the cylinder getting past the cylinder piston into the crankcase. These blow-by gases allow the pressure in the crankcase to rise, whereby leaks and spillages of oil can be the result. In order to prevent a pressure increase and to discharge these blow-by gases in an environmentally friendly manner, these are conducted from the crankcase back into the air feeder line of the internal combustion engine. Furthermore, the specified negative pressure value should not be significantly undershot, because otherwise undesired air can be erroneously sucked into the crankcase.

In the pressure regulating valves that are currently being used, an element familiar to a person skilled in the art under the term "switching membrane" made from elastomer, commonly fluorosilicone rubber is generally employed. These switching membranes are very flexible because of the specific properties of elastomers. Depending on the applied pressure ratios, this switching membrane opens or closes an opening in the pressure regulating valve. The pressure ratio generally results from the pressure differential between the applied pressure in a first chamber and the pressure prevailing in a second chamber of the pressure regulating valve. The pressure in the first chamber may for example be the same as the atmospheric pressure. The switching membrane must react to low switching pressures on the order of 1 to 250 mbar.

Blow-by gases in an internal combustion engine are made up of unburned fuel components, motor oil components and other pollutants resulting from the combustion. These gases attack many elastomer types, whereby damages to the material properties can occur. The components made from these materials become brittle, porous and cracked. If the switching films are damaged, the environmentally damaging blow-by gases pass directly into the environment, because the system is no longer sealed. The switching membrane made from elastomer is generally executed as roll film, in order to realize a specific stroke of the switching membrane. The material in the roll region is also mechanically damaged through the unrolling motion by simultaneous contact with blow-by gases and can thus be damaged.

The DE 26 29 621 A1 discloses a diaphragm valve having a switching membrane that is designed as a switching film clamped at its edge between the housing and the housing cover which is to be brought into a sealing contact by a pressure member against a seating surface provided in the housing, wherein the switching membrane is made of a thinner layer of low elasticity, for example from PTFE, facing towards the housing interior that is resistant to aggressive through-flow media, and an additional, thicker layer made of elastomeric material. Diaphragm valves of this type are primarily used where a high chemical resistance of the materials coming into contact with the through-flow medium is required. Because elastomeric materials do not meet this requirement but the chemically resistant materials such as PTFE do not possess the elasticity necessary for a proper function, films comprising two layers are used. The contact pressure that is applied by the pressure member via the thick, rubber-like layer is transmitted as evenly as possible onto the sealing surface of the switching film that works together with the seating surface in the housing. In this arrangement, relatively large switching pressures of several bar are exerted on the switching membrane for closing the two-layered switching membrane via a pressure spindle that is connected to a hand wheel in order to ensure the necessary sealing function by the stiff PTFE layer.

SUMMARY OF THE INVENTION

It is an object of the invention to create a unit for switching at low pressure differentials that achieves a high operational life in operation in an internal combustion engine with aggressive media, in particular from so-called blow-by gases It is an additional object of the invention to create a method for fluid-tight connection of a switchable closing element to the unit, that achieves a high operational life during operation in an internal combustion engine having aggressive media, in particular from solo called blow-by gases.

The aforementioned object is achieved according to one aspect of the invention by a unit for regulation or control of a fluid pressure and of a switching film connected to at least one housing section, wherein the switching film is formed from a polymer film from a polymer material having fluorine and carbon and wherein a hole cross-section of the at least one housing section is closed off by the switching film. The switching film having fluorine and carbon can be formed in particular by a film from thermoplastic having fluorine and carbon.

According to another aspect of the invention, the additional object is achieved by a method for fluid-tight connection of a switching film to at least one housing section or a unit, wherein the switching film is connected to the at least one housing section by the at least partial melting the joining region and/or the mating surface.

Favorable embodiments and advantages of the invention are disclosed in the further claims, the description and the drawings.

A unit is proposed for the regulation or control of a fluid pressure, having at least one housing section and a switching film connected to the at least one housing section for switching at pressure differentials of 1 to 250 mbar, preferably from 1 to 100 mbar, relative to an ambient pressure acting on the switching film, and for the regulation, release or blocking of a flow of the fluid between an inlet and a discharge for the fluid, wherein the switching film is made out of a polymer material having fluorine and carbon, in particular thermoplastic having fluorine and carbon, and wherein a hole cross-section of the at least one housing section is closed off by the switching film.

The unit does not only serve to release or shut off a through-flow, but regulates between the two switching states "release" or "shut off" by a continuous alteration of the through-flow cross-section as a function of the pressure differential on the through-flow of fluid between the inlet and the discharge. In this manner, the through-flow can be restricted.

A polymer film having fluorine and carbon, in particular a thermoplastic film having fluorine and carbon, is chemically resistant and can switch many switching cycles of the film valve. The long-term stability of the unit is improved. In particular, the polymer film having fluorine and carbon can be PTFE (polytetrafluorethylene). Alternatively, the polymer having fluorine and carbon can be made of a PTFE as the base material, which has admixtures, in particular an admixture of glass fiber, glass spheres, graphite and/or carbon fibers, in particular having a proportion of the admixed substances of up to 60%; similarly, the polymer having fluorine and carbon can be a thermoplastically processable PTFE, which is processable in a spraying process, in particular.

Preferably, the switching film is at most 0.5 mm thick, preferably at most 0.3 mm, particularly preferably at most 0.2 mm thick. The switching film can have a diameter between 40 mm and 100 mm, preferably between 50 mm and 80 mm. It is possible that with correspondingly large diameters somewhat higher thickness of the switching film in the region of over 0.5 mm, for example at most 0.5 mm to 1 mm, can be realized.

A conventional switching membrane made from elastomer of a conventional unit for pressure regulation of an internal combustion engine and/or the pressure regulation of the crankcase of an internal combustion engine is replaced here by a switching film made from the polymer having fluorine and carbon, in particular a thermoplastic having fluorine and carbon. A polymer material having fluorine and carbon such as PTFE can, for example, be manufactured in a sintering process and then mechanically processed. Such a switching film in its normal form is very stiff and actually not appropriate for flexible components. PTFE has an outstanding chemical resistance and can be used in a very broad range of temperatures, wherein the modulus of elasticity is very sharply increased at low temperatures compared to elastomeric materials. For this reason, PTFE is not appropriate for an application as switching film in the temperature range required for automotive applications in an internal combustion engine of typically −40/° C. to +150° C. This disadvantage is avoided in the unit according to the invention by virtue of an advantageous geometry and optionally by an extremely thin wall thickness of the switching film made from the polymer having fluorine and carbon, in particular a thermoplastic having fluorine and carbon.

By reducing the wall thickness of the material in the switching film in an intentionally movable range of a few tenths of a millimeter, wherein the intentionally fixed thickness range as well as the clamping region of the material can also be executed thicker, and a specially developed geometry of the switching film without roll region, as it is conventionally used in prior art, the stiff material is formed into a shape in which it has the necessary flexibility, but nevertheless fulfills the mechanical requirements with respect to crack formation, strain and fatigue strength under reversed bending stresses. By virtue of the special geometry, roll motion no longer takes place, rather a bending motion can be realized having a radius change that can be accomplished with low strain or even practically no strain of the material and with which a lifting motion of the switching film for the unit according to the invention can be implemented.

The switching film can have a plate-like flat body, in particular formed as plate-shaped flat body, having a bending region surrounding a central sealing region, wherein the bending region moves the sealing region in an axial direction with respect to a valve seat, meaning in the direction normal to the flat body, onto the valve seat or away from the valve seat during switching of the switching film by a low-strain—meaning practically strain-free for practical application, in particular strain-free—bending motion. Because the switching film in this embodiment can flex not only in a small surface region, but broadly because of the plate-like shape, individual regions of the switching film are hardly or practically not at all strained. The bending motion is thus executed across a large region of the switching film—and, consequently, with little elastic deformation—in the form of a curvature change with low strain, for example less than 10%.

The sealing region of the switching film can interrupt the through-flow of the fluid between the inlet and the discharge. The switching film can, for example, be located with its sealing region against a seal seat in order to interrupt the through-flow.

For this purpose, the switching film can be movable between its respective maximum positions in the opened and closed state by application of atmospheric pressure as control pressure on one side of the switching film. Advantageously, the switching film can be self-regulating and the switching film can be closed indirectly via a pressure differential between atmospheric pressure in the one chamber of the unit and an operating pressure of the other chamber of the unit. The operating pressure can, for example, be a pressure in a crankcase of an internal combustion engine.

Advantageously, the switching film can alternatively be movable between its respective maximum positions in the opened and closed state, if on one side of the switching film a control pressure is applied that does not equal an atmospheric pressure and/or a mechanical actuating means is provided to switch the switching film.

Via a spring element, which is supported against the at least one housing section, a force is applied to the switching film in order to be able to adjust the control response of the unit. For this purpose, the discharge can have a valve seat arranged at an end in the housing section, which is sealable by the sealing region of the switching film, whereby a discharge of fluid from the inlet to the discharge can be regulated. The spring element in this arrangement exerts the appropriate counterforce on the switching film to achieve a control response of the unit in the desired pressure region. The side of the switching film facing away from the fluid to be regulated is generally supplied here with atmospheric pressure.

According to the invention, a hole cross-section of the at least one housing section of the unit is closed off by an operating region of the switching film. In this manner the through-flow of the unit can be regulated, released, shut off or limited. An edge region surrounding the operating region of the switching film allows a fluid-tight connection of the switching film made from a polymer having fluorine and carbon, in particular a thermoplastic having fluorine and carbon, against the housing of the unit, which can be advantageously made from plastic, for example, glass-fiber reinforced polyamide (PA), and represents an additional great advantage over the prior art, in which the impermeable or closed membranes have no claim to tightness, rather, they are only interlockingly connected to the housing. By virtue of the fluid-tight connection, a region of the unit is advantageously guaranteed to be sealed as fluid-tight, for example as a pressure regulation valve, because the switching film can in each case seal a housing section fluid-tight by being fixedly connected to the housing section, as well as sealing of the interior spaces of two housing sections against each other, if the first housing section is sealed with a second housing section, such as with a housing cover.

According to one advantageous embodiment, at least one circumferential mating surface can be provided situated radially to the outside on the at least one housing section at which the switching film is connected, in particular fixedly connected, in particular fixedly and fluid-tightly connected to the at least one housing section. By the fixed connection of the switching film to the outer radially circumferential mating surface, the central inner region of the switching film can move freely as a whole in the axial direction and as a sealing region of the switching film can thus exercise the actual switching function of the unit, for example as pressure regulation valve. Through the fluid-tight connection of the switching film against at least one housing section, it can also be effectively prevented that possible outgassing of the material into the environment.

According to one advantageous embodiment, a radially outwardly situated joining region of the switching film can be connected to the at least one housing section by the at least partial melting of the joining region of the switching film and/or the mating surface of the housing section, in particular integrally and/or interlockingly. An integral and/or interlocking connection of the switching film by the melting of the material, for example through welding, with the mating surface of the housing section, which can ensure the fluid-tight sealing of the hole cross-section of the housing section as well as the fixed and durable connection of the switching film for a safe function during the operation of the unit. The melting allows for one of the joining members, the joining region of the switching film or the mating surface of the housing section, to melt and to at least partially connect with the respective other joining member. Alternatively, it is also possible that both joining members are melted and that the melted materials mix and thus are firmly connected when setting. It is furthermore possible that only the housing section is melted and the thus melted material of the housing section connects to the switching film. This way, the materials do not mix directly. This way, however, a partially integral, partially interlocking connection can be achieved. In particular an integral connection can be achieved at least in one of the top material layers by activating at least one surface of the switching film.

According to an advantageous embodiment, at least one circumferential groove can be provided in the mating surface of the at least one housing section to accommodate melted material from the joining region and/or the mating surface, whereby in particular one circumferential groove can be radially situated within the mating surface of the at least one housing section and one circumferential groove radially situated outside the mating surface of the at least one housing section to accommodate melted material from the joining region and/or the mating surface. The melted and excess material can in this manner be effectively accommodated by the groove and thus distributed in the groove in a targeted manner during the application and pressing of the switching film against the housing section, so that the joining region of the switching film and the mating surface of the housing section adhere directly against one another, thereby creating a fluid-tight and durable connection. This way, the excess melted material can, in particular, flow from both sides of the joint and be distributed in the grooves so that the joining region of the switching film and the mating surface of the housing section can directly bond with each other.

For preparation of the melting, it can be advantageous to prepare the surface of the switching film accordingly in that region where the switching film will bond with the housing section in order to change the surface tension. Such an activation can thus expediently include one or more methods such as etching, plasma treatment, mechanical roughening, stamping, perforating or similar, appropriate methods. This may improve the connection between the joining members. In particular, it is advantageous to subject a surface of the switching film that is exposed to the fluid, such as is the case in a first chamber of the first housing section, to a treatment by activation.

According to one advantageous embodiment, the mating surface of the at least one housing section can be formed to be self-adjusting in a longitudinal direction. In particular, the mating surface can be formed conically or curved upwards or downwards or corrugated.

By virtue of the self-adjusting mating surface, a particularly good connection of a different housing section as well as of the switching film can be ensured with automatic centering of the first housing section or of the switching film before and during the process of the connection.

According to one advantageous embodiment, at least one radially circumferential groove can be provided radially inside the mating surface of the at least one housing section and radially delimited on the inside by an edge for supporting the switching film when there are axial movements transverse to the hole cross-section, wherein in particular two axial opposing and/or radially offset grooves can be provided with an edge, in particular a raised lip. A raised lip on the edge advantageously supports dynamic movements of the switching film with its working region during the execution of the function in the pressure valve and simultaneously achieves a protection against damage by the motion of the switching film. The groove with the raised lip can thus be expediently configured in such a way that it accommodates the welding beads in such a way that, after the welding, no welding beads remain in the pending region of the switching film to avoid any damage to the same during operation. The switching film is thereby always located on at least one edge, preferably however at two edges simultaneously during its switching motion. In order to prevent a damage to the switching film during the joining process such as, for example, by an unacceptable compression of the switching film by the edges, the edges can be arranged radially offset. A realization of a connection is thus easier, in that the switching film is located on two edges simultaneously. A movement on the boundary surface to a welding bead or an edge can then be prevented. The edge can be optimized for the film motion so that the switching film in operation is protected against damage by the edge. It is also possible to apply a prestress of the switching film via these edges.

According to one advantageous embodiment, a housing can be provided with the first housing section and a second housing section, and the first chamber can be separated fluid-tight from a second chamber by the switching film. The second chamber of the unit can thus be supplied with an atmospheric pressure. For an effective control response of the unit, the switching film should be able to move as freely as possible, for which reason the second chamber, which is separated by the functional region of the switching film from the first chamber, in which the fluid to be controlled is located, is expediently in connection with the environmental region, meaning with the atmospheric pressure.

According to one advantageous embodiment, at least one housing section can be formed radially outside the mating surface for closure of the at least one housing section with the second housing sections through at least partially melting the edge. Advantageously, at least one housing section can thus be formed radially outside the mating surface for closure of the hole cross-section through melting with the switching film. Additionally, the housing section, in which the hole cross-section is closed fluid-tight by the switching film, can in this way be firmly welded to another housing section, for example a cover, or the housing section can be welded to a different component. In this manner, a further fluid-tight sealing of the unit for safe operation, for example as a pressure regulating valve, can be achieved. The mating surface for the welding can thus expediently be designed so that the weld beads from the welding process do not adversely affect the connection of the housing section.

According to one advantageous embodiment, the polymer material having fluorine and carbon is polytetrafluoroethylene or polytetrafluoroethylene with admixtures or thermoplastically processable polytetrafluoroethylene.

According to a different aspect of the invention, a method for the fluid-tight connection of a switching film to at least one housing section of a housing of a unit is proposed, wherein the switching film is formed from a polymer material having fluorine and carbon, in particular a thermoplastic having fluorine and carbon, and wherein a joining region of the switching film situated radially to the outside that is connected, and in particular firmly connected, in the area of at least one mating surface to the at least one housing section by at least partially melting the joining region and/or the mating surface. This method comprises an application and pressing of the joining region of the switching film against the mating surface of the at least one housing section, followed by an at least partial melting of the joining region and/or the mating surface. After the compressing the switching film with the housing section and the melting and solidifying of the melted material, a durable and fluid-tight connection of the switching film at the housing section and thus a fluid-tight sealing of the hole cross-section of the housing section can thus be achieved.

According to one advantageous embodiment, the joining region of the switching film is pretreated by at least one of the methods, etching, plasma treatment, mechanical grinding, embossing or perforation. For pretreatment of the melting, it is advantageous to accordingly pretreat and activate the surface of the switching film in the region where it is connected with the housing section, which can be achieved with one of the procedures mentioned. In this way the surface tension can be changed, whereby the process of the thermal fusion can be essentially improved.

According to one advantageous embodiment, the melting of the joining region of the switching film and/or the melting of the mating surface of the housing section can be achieved by means of at least one of the methods of melting, ultrasound melting, mirror-imaged welding, laser welding, thermal fusion. These welding methods are suitable in particular for creating a permanent bond between joining members from plastic and can be used for that in a proven manner.

According to one advantageous embodiment, a second housing section can advantageously be placed on the switching film after the placement of the switching film on the at least one first housing section with the joining region over the mating surface, and the housing is thus formed. At the same time, the second housing section can also be expediently connected to the switching film and/or to the first housing section by melting the material. Alternatively, it is also conceivable to radially connect the two housing sections, which can be formed from, for example, glass-fiber reinforced polyamide (PA), outside the switching film, in particular by welding.

According to an advantageous embodiment, the joining region of the switching film can be compressed when the housing is sealed in the region of the mating surface. In this way, the fluid-tight connection can also be favorably improved.

Advantageously, the switching film can be axially supported by at least one groove running radially inside the mating surface in the at least one housing section, which is radially delimited inside by a lip, in particular a raised lip, for supporting the switching film during axial movements transverse to its cross-sectional area. In this way, dynamic movements of the switching film during the execution of the function in the pressure regulating valve can be advantageously supported and, at the same time, a protection against damage by the movement of the switching film can be achieved. The groove with the raised lip is thus expediently configured in such a way that it accommodates the welding bead so that, after the melting process, no residues from a welding bead remain in the pending region of the switching film to avoid any damage to the same during operation. The switching film is thereby always located on at least one edge, preferably however at two edges simultaneously during its switching motion. In order to prevent a damage to the switching film during the joining process such as, for example, by an unacceptable compression of the switching film by the edges, the edges can be arranged radially offset. A realization of a connection is thus easier, in that the switching film is located on two edges simultaneously. A movement on the boundary surface to a welding bead or an edge can then be prevented. The edge can be optimized for the film movement so that the switching film is protected against damages by the edge during operating mode.

Advantageously, the switching film can also be axially supported by two grooves arranged in the housing with an edge, which are arranged opposite each other or radially displaced relative to each other. In this further embodiment, the edges of the housing section can be mutually shifted so that the switching film is not crimped in this region during the joining process. It is also possible to adjust the pretension of the switching film via these edges.

Furthermore, the housing can also be sealed to a radial outer circumference in an expedient manner after connection of the switching film to the at least one housing section by means of at least partially melting a raised lip of at least one housing section radially arranged outside of the mating surface. Additionally, the housing section, in which the hole cross-section is closed fluid-tight by the switching film, can in this way be firmly welded to another housing section, for example a cover, or the housing section can be welded to a different component. In this manner, a further fluid-tight sealing of the unit for safe operation, for example as a pressure regulating valve, can be achieved. The mating surface for the welding can thus expediently be designed so that the weld beads from the welding process do not adversely affect the connection of the housing section and the connection of the switching film with the housing components.

According to a further aspect of the invention, the unit according to the invention is used for pressure regulation of an internal combustion engine and/or for pressure regulation of a crankcase of an internal combustion engine.

BRIEF DESCRIPTION OF THE DRAWINGS

Further advantages arise from the following drawing description. Embodiments of the invention are illustrated in the drawings. The drawings, the description and the claims contain numerous features in combination. A person skilled in the art will also expediently consider the features on an individual basis and combine them into other appropriate combinations.

Shown by way of example are:

FIG. 7 a simplified detail of a version of the unit's joining region from FIG. 3 with just one groove and without a second housing section in a sectional view;

FIG. 8 a detail of the unit's joining region from FIG. 7 after the connection process in a sectional view;

FIG. 9 a detail of the unit's joining region from FIG. 3 in a sectional view;

FIG. 10 a detail of the unit's joining region from FIG. 9 after the connection process in a sectional view;

DETAILED DESCRIPTION

Figure 1:
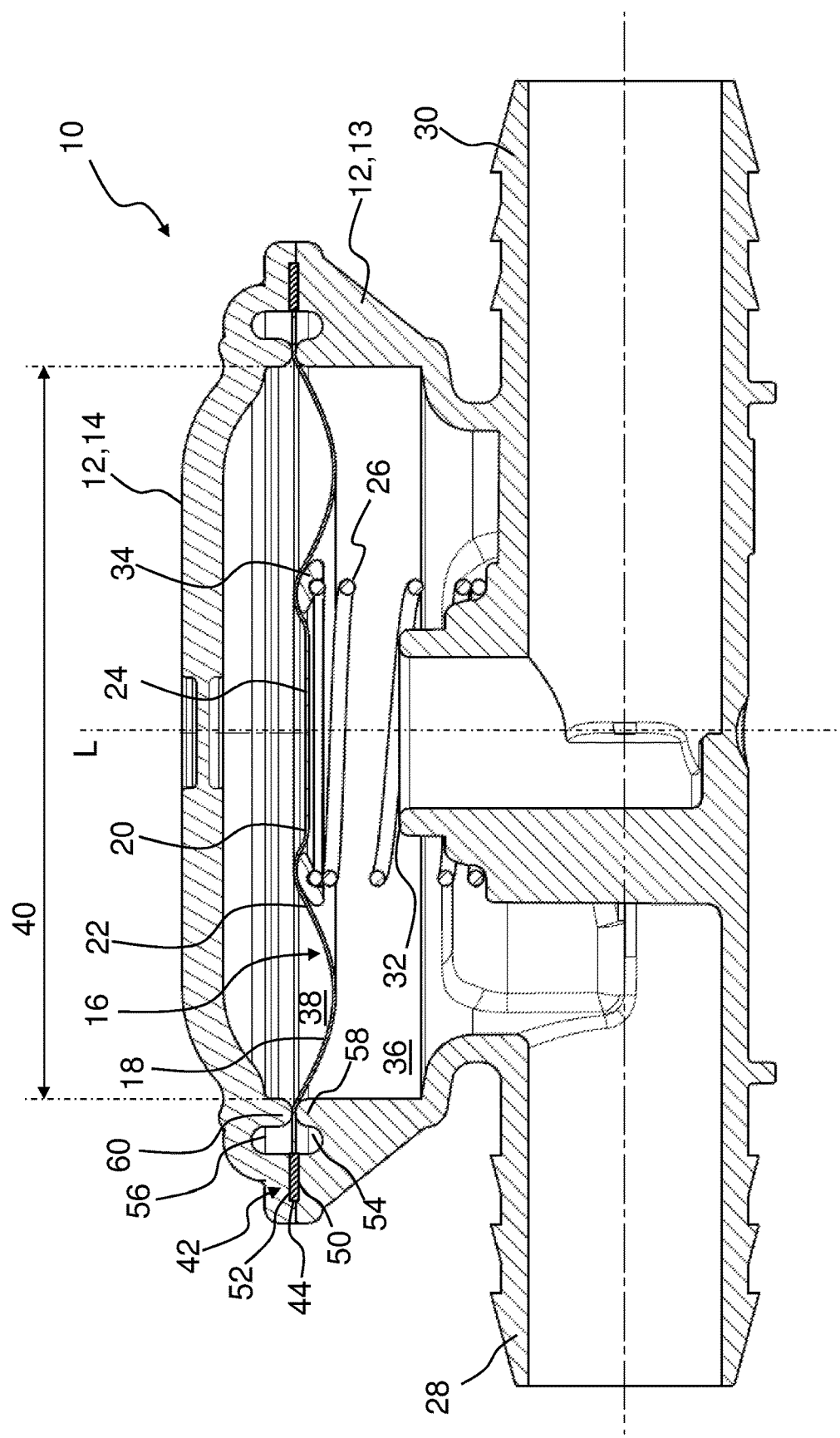
FIG. 1 a unit having a switching film made from a polymer with fluorine and carbon according to an exemplary embodiment of the invention in a sectional view.

The same or similar components in the figures are referenced with same reference characters. The figures merely show examples and are not intended to be restrictive.

FIG. 1 shows a sectional view of a unit 10 for the regulation or control of a fluid pressure using a switching film 22 made from a polymer having fluorine and carbon according to an exemplary embodiment of the invention. The polymer material having fluorine and carbon is thus polytetrafluoroethylene or polytetrafluoroethylene with admixtures or thermoplastically processable polytetrafluoroethylene particularly in a spraying process. The unit 10 serves for regulation or control of a fluid pressure, in particular for application for pressure regulation of an internal combustion engine and/or for the pressure regulation of a crankcase of an internal combustion engine. The unit 10 has a housing 12 having a first housing section 13 and a second housing section 14, the housing cover, wherein the first housing section 13 has an inlet 28 and a discharge 30 for the fluid. The switching film 22 is formed from a polymer film having fluorine and carbon, for example PTFE, and is clamped with a joining region 42 between first housing section 13 and the second housing section 14.

The hole cross-section 40 of the two housing sections 13, 14 is sealed by the switching film 22 with its functional region. Two circumferential mating surfaces 50, 52 are provided situated radially to the outside on the two housing sections 13, 14, at which the switching film 22 is connected fluid-tight to the two housing sections 13, 14. In the exemplary embodiment shown, a joining region 42 of the switching film 22 is thus, in particular, integrally and/or interlockingly connected to the two housing sections 13, 14 by means of an at least partial melting of the joining region 42 of the switching film 22 and/or the mating surface 50, 52 of the housing section 13, 14. In the exemplary embodiments in FIGS. 1 and 2, the melted area 44 is shown in a diagram by means of welding beads 48. The details of the melted area 44 with grooves 46, 64 and welding beads 48 are shown in FIGS. 4, 6, 8, 10, and 12.

The switching film 22 separates a first chamber 36 of the unit 10 from a second chamber 38 in a fluid-tight manner. There is a pressure differential between the first chamber 36 and the second chamber 38, wherein the second chamber 38 is connected (not depicted) to the surrounding space, meaning to the atmosphere. The switching film 22 can be moved with pressure differences of 1 to 250 mbar, preferably from 1 to 100 mbar, and serves to release or shut off a through-flow of the fluid between the inlet 28 and the discharge 30. The inlet 28 of the unit 10 is fluidically connected during use to, for example, the crankcase of an internal combustion engine, while the discharge 30 is fluidically connected to the breather line. The switching film 22 has a plate-like flat body 16 having a corrugated bending region 18 surrounding a central sealing region 24. The bending region 18 moves during switching of the switching film 22 by a low-strain, in particular strain-free bending motion of the sealing region 24 with respect to a valve seat 32 in an axial direction L toward the valve seat 32 or away from the valve seat 32. For this, the switching film 22 has at least in the bending region 18 a thickness of at most 0.5 mm, preferably of at most 0.3 mm, most preferably of at most 0.2 mm. The diameter of the switching film 22 can thus be between 40 mm and 100 mm, preferably between 50 mm and 80 mm.

The bending region 18 extends in a wave-like manner in radial direction around sealing region 24, wherein a recess on a flat side corresponds to an elevation on the other flat side of the switching film 22. The sealing region 24 seals the valve seat 32 if it is located on the valve seat 32. A spring element 26 is provided that is supported at the first housing section 13 which exerts a force on the sealing region 24 of the switching film 22. The spring element 26 is supported here by an annularly formed plate 34 at the sealing region 24. The sealing region 24 is formed as a bowl-shaped projection 20 of the switching film 22, wherein the plate 34 in the form of a support ring annularly encloses this projection. The spring element 26 can alternatively engage the switching film 22 without plate 34 and thus be sprayed on its end face that is turned towards the projection 20 for protection of the switching film 22, so that the encapsulation can replace the plate 34.

A groove 54, 56 running radially is provided inside the mating surface 50, 52 of each of the two housing sections 13, 14, which is delimited radially inside by an edge 58, 60 for supporting the switching film 22 during axial movements transverse to the hole cross-section 40. The two grooves 54, 56 are located axially opposite one another. Because the switching film 22 is located on the rounded edges 58, 60 and is clamped between them, the switching film 22 is protected against excessive wear and damages from sharp edges resulting from axial movements of its working region because of the regulating function of the unit 10.

Figure 2:
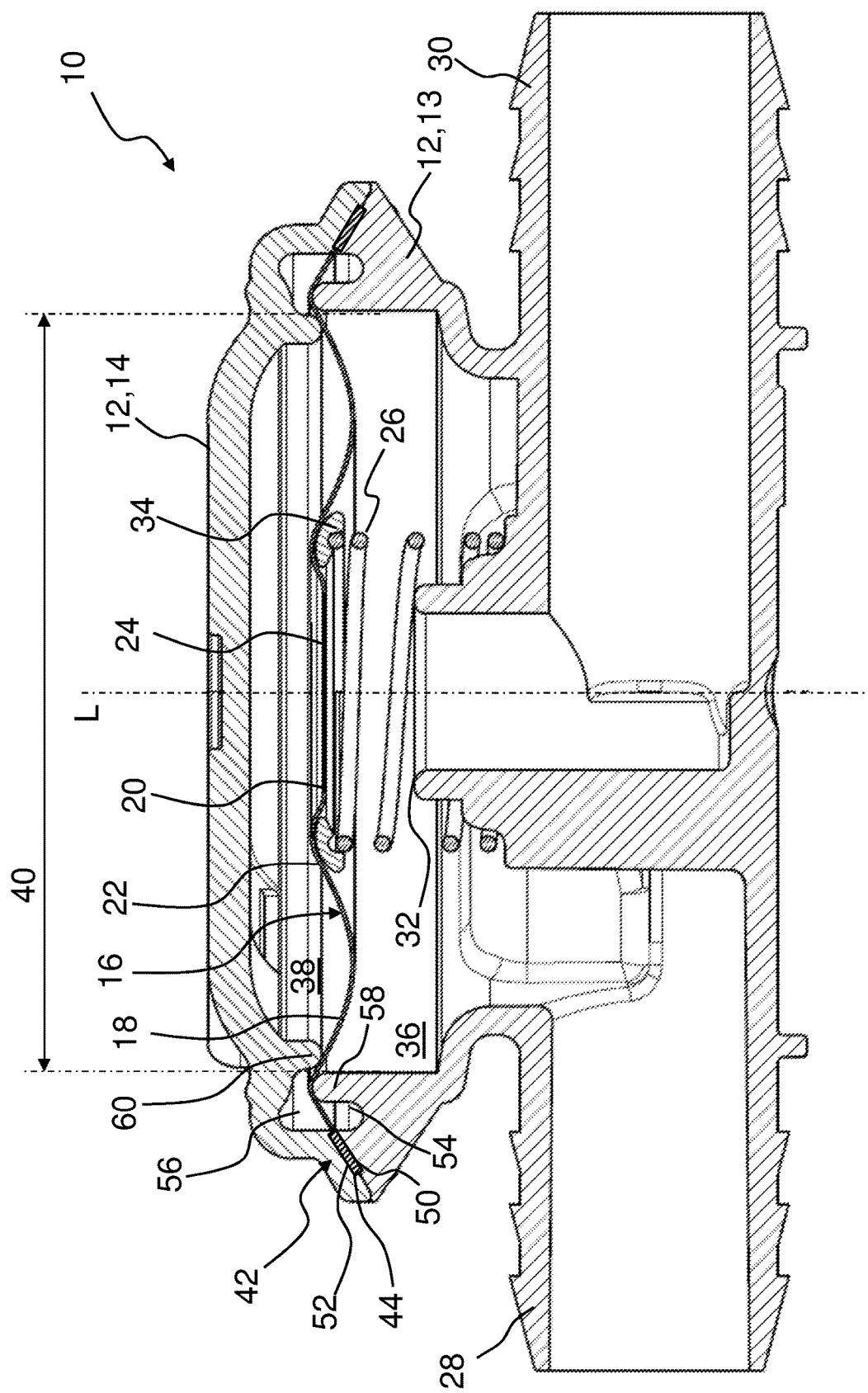
FIG. 2 a unit having a switching film according to an additional exemplary embodiment of the invention in a sectional view.

FIG. 2 shows in a cross-sectional view a unit 10 having a switching film 22 according to an additional exemplary embodiment of the invention. The basic design of the unit 10 essentially corresponds to the exemplary embodiment in FIG. 1. The mating surfaces 50, 52 of the two housing sections 13, 14, however, are formed conically in the longitudinal direction L. In this manner, the switching film 22 can advantageously be centered during the joining of the switching film 22 at the first housing section 13 and during assembly of the housing 12 by placement of the second housing section 14. The grooves 54, 56 with their edges 58, 60—in contrast to the embodiment in FIG. 1 where they are arranged axially opposed—are arranged in this case radially displaced, which can also be beneficial for the support of the switching film 22 during the axial movement of the switching film 22.

Figure 3:
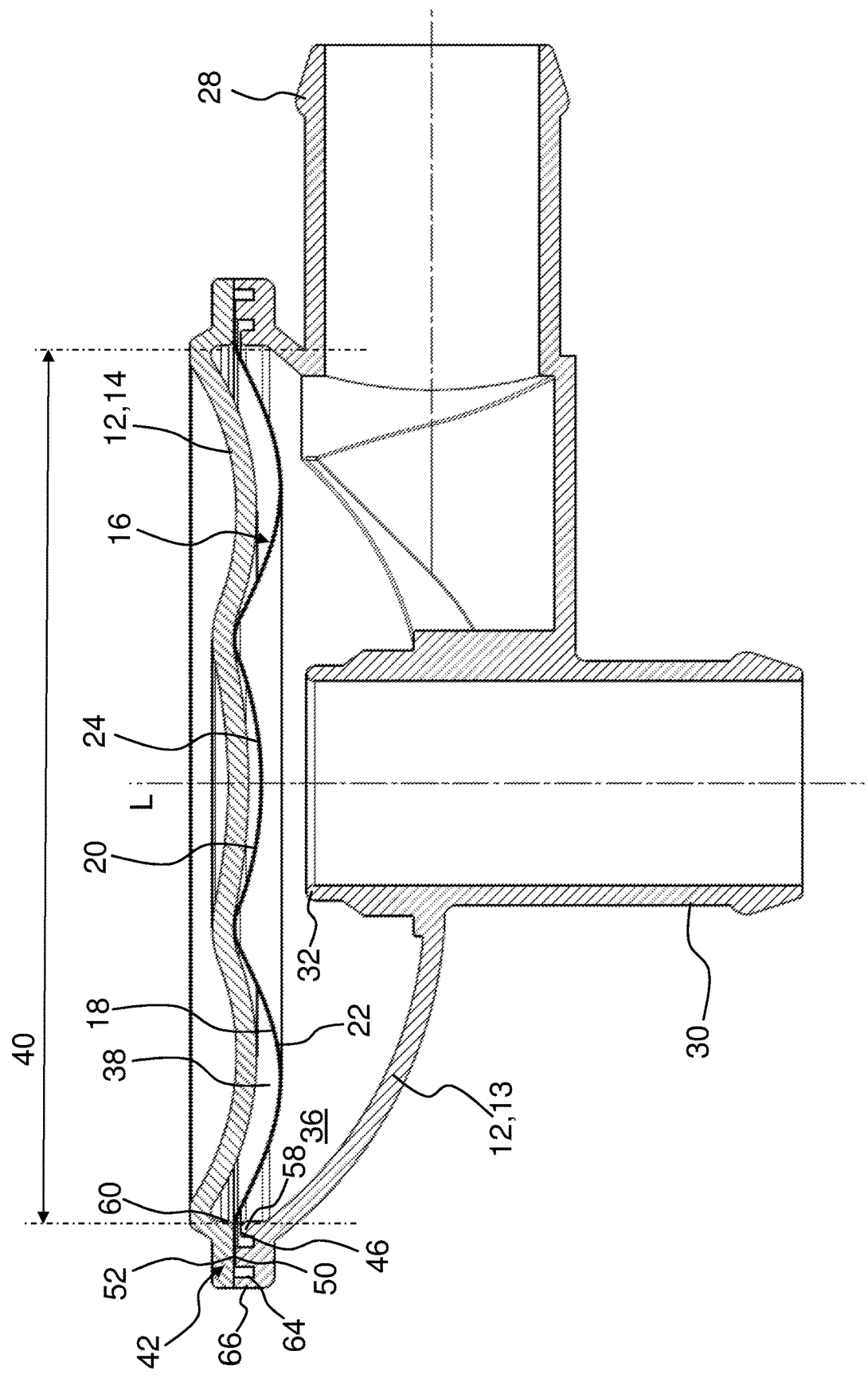
FIG. 3 a unit having a switching film that is mounted but not yet connected according to a next exemplary embodiment of the invention in a sectional view.

FIG. 3 shows a unit 10 having a bonded switching film 22 prior to the connection process according to a next exemplary embodiment of the invention in a sectional view. The spring element 26 was left out to provide greater clarity. FIGS. 7 and 9 both show an detail of the housing 12 of unit 10 from FIG. 3 with the joining region 42 or, respectively, a simplified detail of the housing 12. FIG. 7 is shown as another embodiment of the connection of a version without the groove 64 in the first housing section 13, wherein only a groove 46 and no second housing section is provided above the switching film 22. In an alternative embodiment, a second housing section can be provided which covers the switching film 22.

The sectional view of unit 10 in FIG. 3 shows that a circumferential groove 46 is provided in the mating surface 50, of the first housing section 13 to accommodate melted material from the joining region 42 and/or the mating surface 50. In comparison with the two exemplary embodiments in FIGS. 1 and 2, the unit 10 in FIG. 3 does not have any grooves 54, 56. The switching film 22 is mounted between the two housing sections 13, 14. Lips 58, 60 with a rolling radius to relieve the switching film 22 are provided.

A joining region 42 situated radially outside the switching film 22 is thus firmly connected to the first housing section 13 in the area of the mating surface 50 means of an at least partial melting of the joining region 42 and/or the mating surface 50 by placing and pressing the joining region 42 of the switching film 22 against the mating surface 50 of the first housing section 13 and at least partially melting the joining region 42 and/or the mating surface 50. Here, the melting of the joining region 42 and/or the mating surface 50 can be achieved by means of at least one of the methods of melting, ultrasound melting, mirror-imaged welding, laser welding, thermal fusion. Advantageously, the switching film 22 in this arrangement, at least in the region of the joining region 42, has an activated surface with altered surface tension in order to achieve a good connection, wherein the joining region 42 is prepared, for example, by one of the methods, etching, plasma treatment, mechanical roughening, embossing or perforation. After the seating of the switching film 22 on the at least first housing section 13 with the joining region 42 over the mating surface 50, a second housing section 14 is seated on the switching film 22 and thus forms the housing 12. The joining region 42 of the switching film 22 is compressed during the sealing of the housing 12 in the region of the mating surfaces 50, 52.

Figure 4:
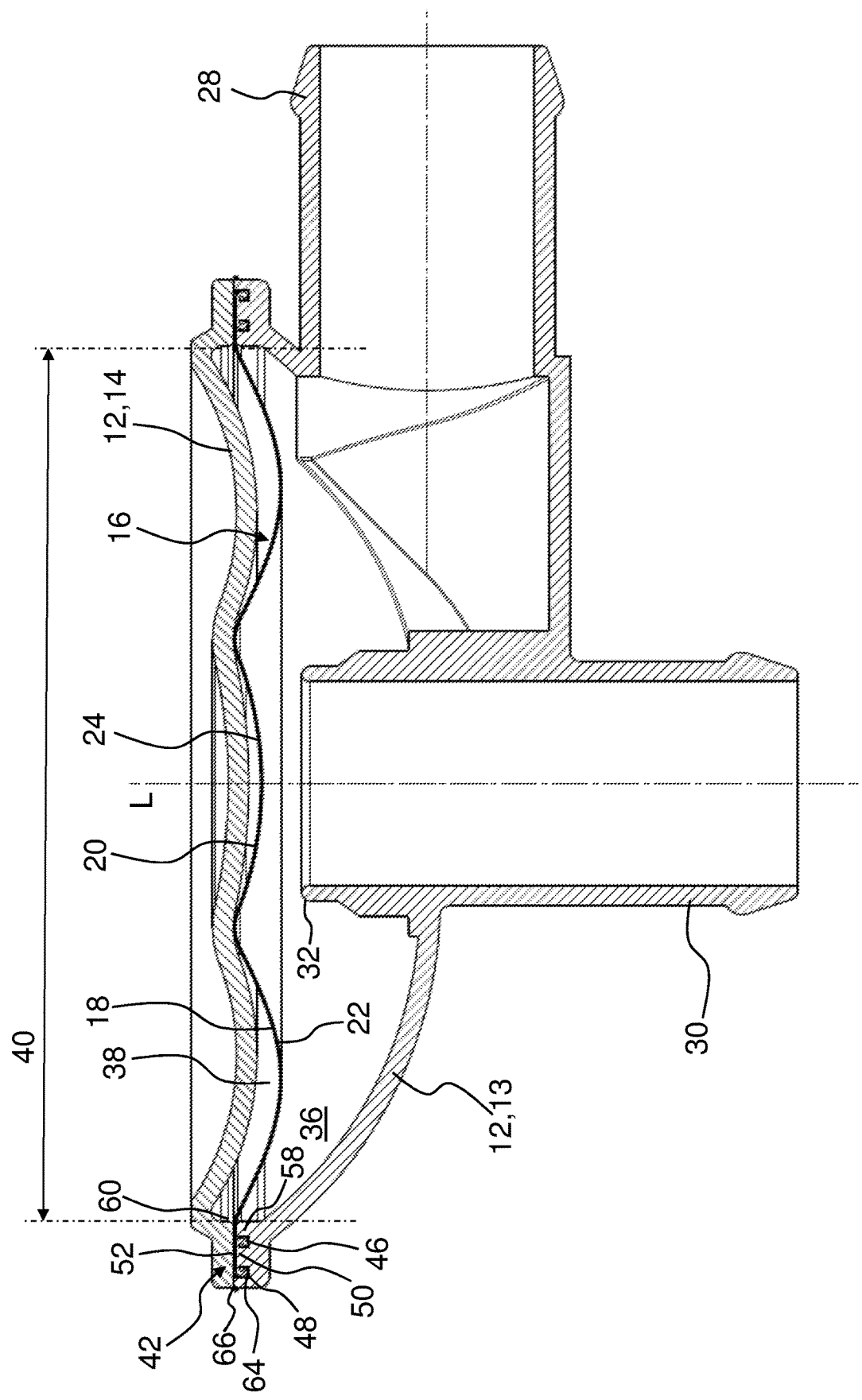
FIG. 4 the unit from FIG. 3 with connected switching film and welded housing in a sectional view.

FIG. 4 shows the unit 10 from FIG. 3 with the bonded switching film 22 and the welded housing 12. FIGS. 8 and 10 both show a simplified detail of the housing 12 of unit 10 from FIG. 4 with the joining region 42 or, respectively, a detail of the joining region 42. FIG. 8 illustrates as another embodiment of the connection of a version without the groove 64 in the first housing section 13.

The housing 12 is sealed to a radial outer circumference in an expedient manner after connection of the switching film 22 to housing section 13 by means of at least partially melting a raised lip 66 of the housing section 13 radially arranged outside of the mating surface 50. To this purpose, the housing section 13 formed radially outside the mounting surface 50 for closure of the hole cross-section 40 through welding. To this purpose, the first housing section 13 comprises the circumferential grooves 46, 64 whose purpose it is to accommodate a welding bead 48 created during the welding of the housing 12 which is primarily formed from plastic, so that the two mating surfaces 50, 52 of the two housing sections 13, 14 are positioned directly on top of the switching film 22 after the joining process.

Comparing the details shown in FIGS. 7 and 9 with the details shown in FIGS. 8 and 10, it becomes clear that the two housing sections 13, 14 (FIGS. 9 and 10) are kept at a distance from each by the circumferential lip 66 of the first housing section 13 other directly after the application of the switching film 22 and placement of the second housing section 14, which does not disappear until after the two housing sections 13, 14 are welded together by the partial melting of the material on the mating surface 50 as well as the raised lip 66 of the housing section 13, so that this way the two housing sections 13, 14 lie directly on top of the switching film 22 and the switching film 22 is pressed between them in a fluid-tight manner.

Figure 5:
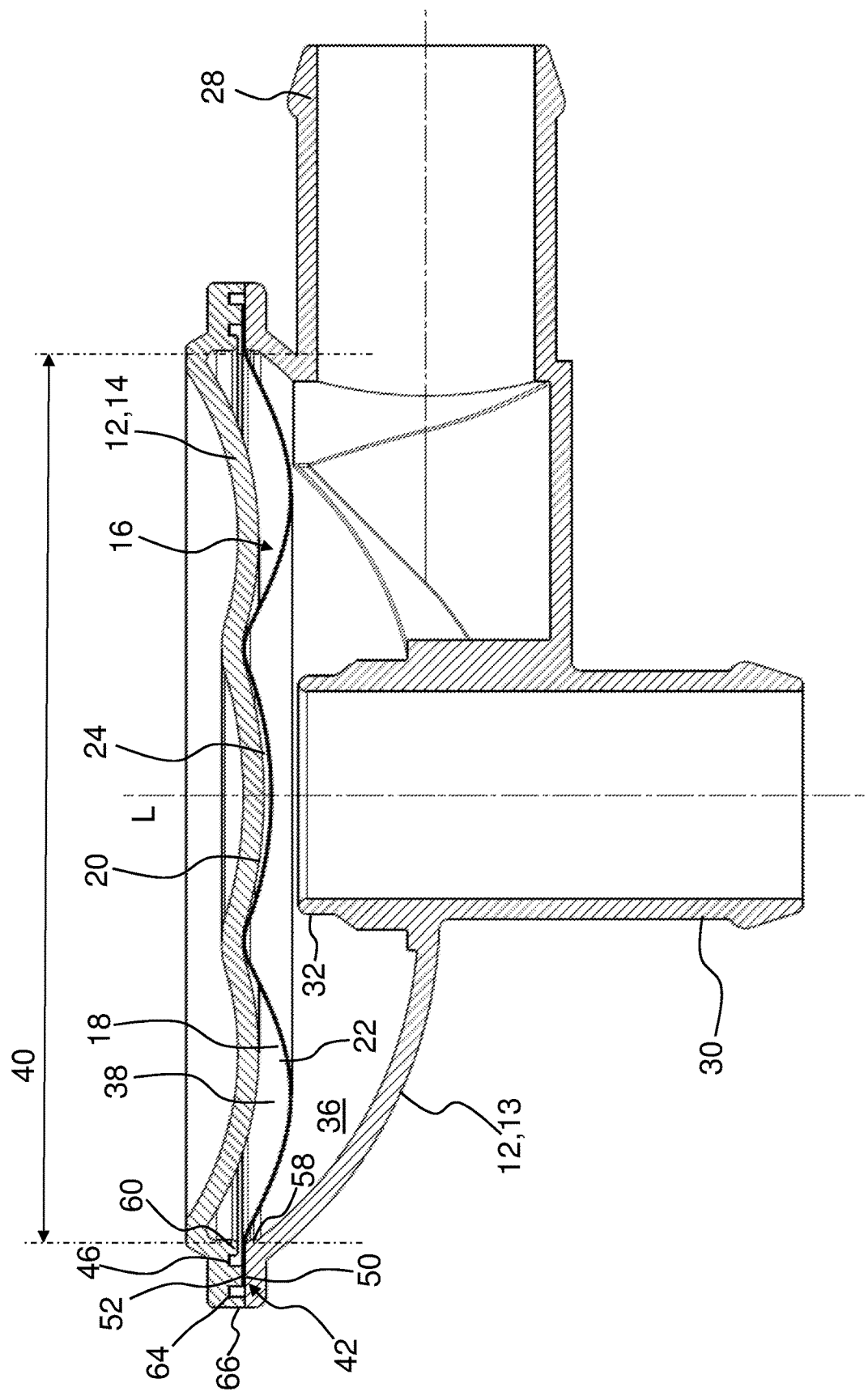
FIG. 5 a unit having a switching film that is mounted but not yet connected according to a next exemplary embodiment of the invention in a sectional view.
Figure 6:
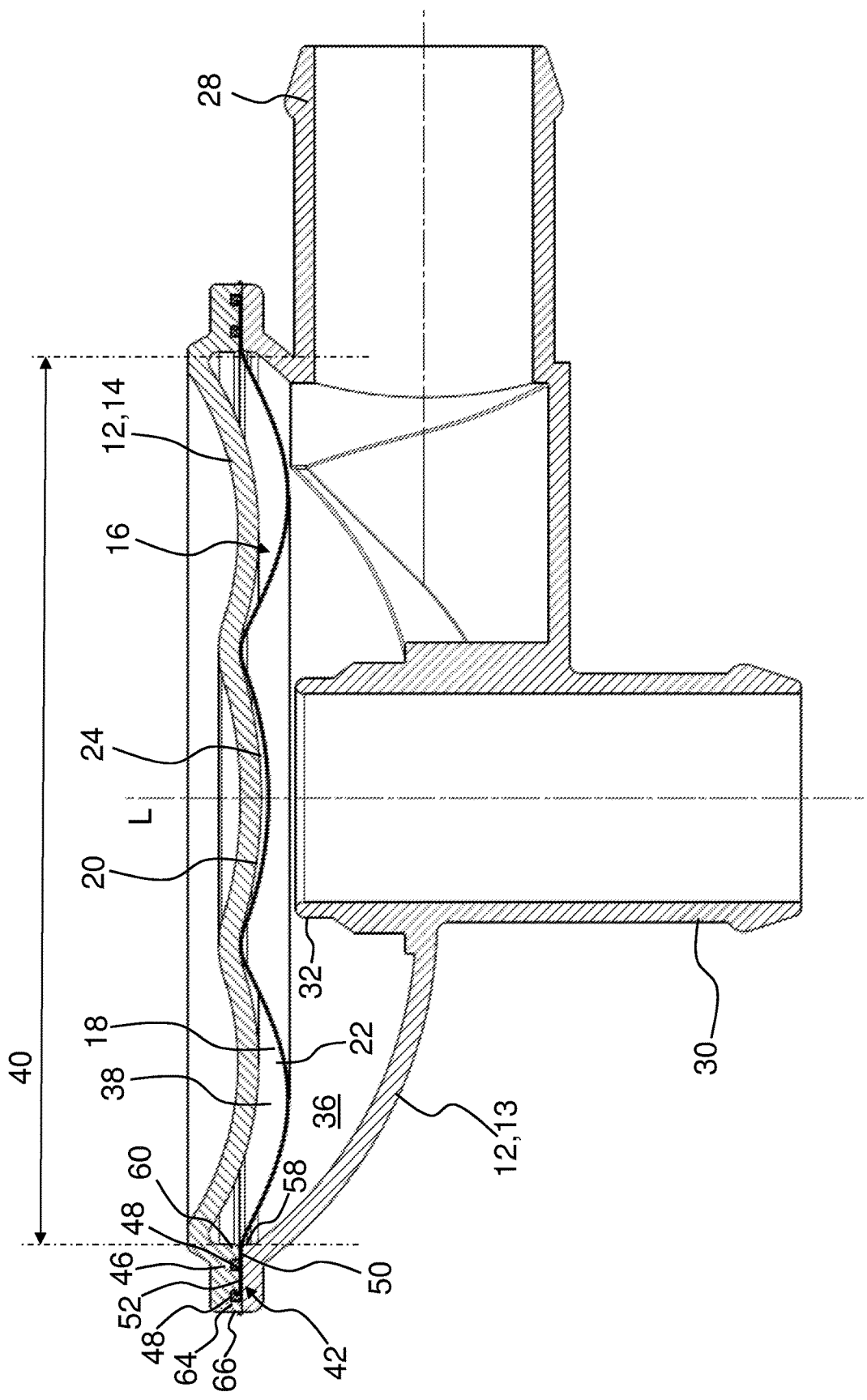
FIG. 6 the unit from FIG. 5 with connected switching film and welded housing in a sectional view.
Figure 12:
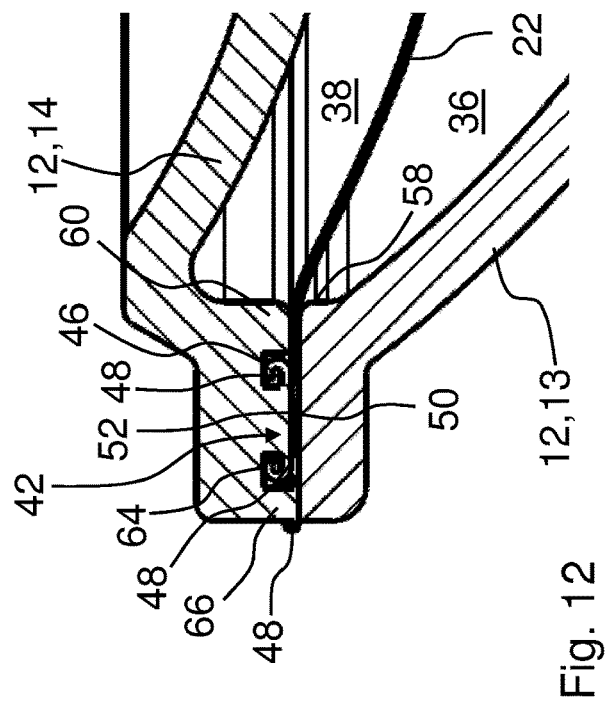
FIG. 12 a detail of the unit's joining region from FIG. 6 after the connection process in a sectional view.
Figure 11:
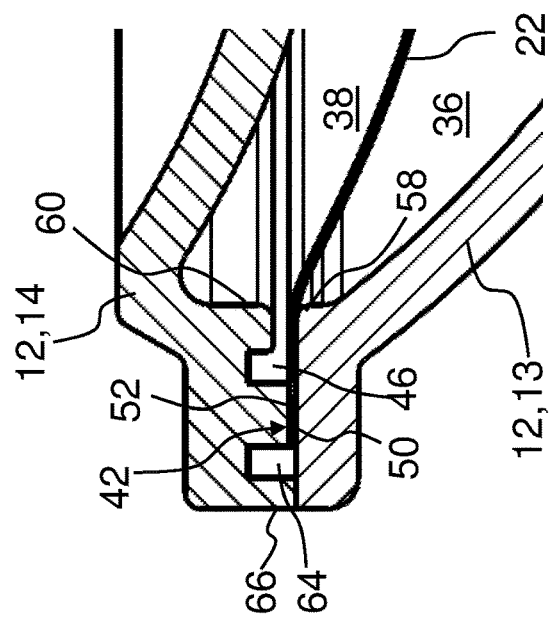
FIG. 11 a detail of the unit's joining region from FIG. 5 in a sectional view.

FIGS. 5 and 6 shows a unit 10 with a switching film 22 according to another exemplary embodiment of the invention in a sectional view, wherein the switching film 22 in FIG. 6 is firmly connected with the second housing section 4, which is formed as a lid. The arrangement of the grooves 46, 64 is formed laterally inversed to the embodiment shown in FIGS. 3 and 4 in the second housing section 14. Details about the connection of the switching film 22 with the second housing section 14 as well as the connection of the second housing sections 13, 14 are shown in FIGS. 11 and 12. The joining region 42 of the switching film 22 is thus integrally and/or interlockingly connected to the two housing sections 14 by means of a melting of the joining region 42 and/or the mating surface 52 of the housing section 14. The thus created welding beads 48 can be accommodated in the grooves 46, 64. The two housing sections 13, 14 are integrally connected by the melting of the raised lip 66. By melting the material in the welding beads 48, the two housing parts 13, 14 lie directly on top of the switching film 22 at the mating surfaces 50, 52 after the melting of the material and thereby further compress the switching film 22.

What is claimed is:

1. A regulation unit for the regulation or control of a fluid pressure, comprising:
   a regulation housing having:
      at least a first housing section and a second housing section;
      a fluid inlet port;
      a fluid discharge port;
   a switching film connected to at least one of the housing sections and adapted to switch at pressure differentials of 1 to 250 mbar relative to an ambient pressure acting on the switching film;
   wherein the switching film is adapted for regulation, release or blocking of a flow of the fluid between the inlet port and the fluid discharge port;
   wherein the switching film is made out of a polymer material having fluorine and carbon,
   wherein the first housing section has a first chamber,
   wherein the second housing section has a second chamber,
   wherein the first housing section and the second housing section each have a hole through which the first chamber opens into the second chamber of the second housing section, the hole having a hole cross-section;

wherein the first housing section and the second housing section each have a circumferential mating surface situated radially to the outside and radially surrounding the hole cross-section, wherein one of the circumferential mating surfaces of the first housing section or the second housing section have at least one circumferential groove formed into the circumferential mating surface, a first circumferential groove of at least one of the circumferential groove is positioned radially between and spaced apart from a radially outer circumference of the switching film and the hole cross-section, wherein the switching film is fixedly and fluid-tightly connected to the circumferential mating surface of at least one housing section and closing off the hole cross-section;

wherein the circumferential mating surface of at least one housing section includes a second circumferential groove of the at least one circumferential groove, the second circumferential groove positioned radially outwardly from and surrounding the first circumferential groove of the at least one circumferential groove;

wherein the switching film has a joining region positioned radially to the outside of the switching film;

wherein the circumferential mating surface of at least one housing section is partially melted onto the joining region of the switching film, integrally connecting the circumferential mating surface to the joining region, wherein the first and second circumferential grooves receive melted material from the joining region and/or the circumferential mating surface.

2. The regulation unit according to claim 1, wherein the switching film is fixedly and fluid-tightly connected to the at least one of the housing sections, covering and sealing off the hole cross-section.

3. The regulation unit according to claim 2, wherein the material of the switching film comprises:
polytetrafluoroethylene, or
polytetrafluoroethylene with admixtures, or
thermoplastically processable polytetrafluoroethylene.

4. The regulation unit according to claim 1, wherein the circumferential mating surfaces are formed in a longitudinal direction (L) traverse to a plane defined by the joining region of the switching film;

wherein the circumferential mating surfaces of the housing sections are formed conically such that the conically formed surfaces aid a centering alignment of the circumferential mating surfaces with each other during mating of the circumferential mating surfaces and the switching film.

5. The regulation unit according to claim 1, wherein at least one housing section comprises a circumferential raised lip radially outside the circumferential mating surface for closure of the first housing section with the second housing section by at least partially melting of the raised lip.

6. A method of forming a fluid-tight connection of the switching film onto at least one housing section of a regulation housing of a regulation unit according to claim 1, comprising the steps of:
providing the switching film formed from the polymer material having fluorine and carbon, the switching film having the joining region arranged radially to the outer side of the switching film;

providing the first housing section having the first chamber, the first chamber surrounded by the first circumferential groove of the at least one circumferential groove formed into the mating surface of the first housing section;

providing the second housing section having the second chamber, the second chamber surrounded by the first circumferential groove of the at least one circumferential groove;

wherein the circumferential mating surface of at least one housing section includes the second circumferential groove of the at least one circumferential groove, the second circumferential groove positioned radially outwardly from and surrounding the first circumferential groove of the at least one circumferential groove;

incorporating a foam material into at least one of the first circumferential groove or the second circumferential groove of the at least one circumferential groove of the first housing section;

placing the switching film onto the first housing section having the foam material with the joining region arranged at the circumferential mating surface of the first housing section;

pressing the joining region of the switching film against the circumferential mating surface of the first housing section, the foam material sealing the switching film joining regions onto the circumferential mating surface of the first housing section;

at least partially melting the joining region and/or the mating surface to fixedly connect and seal the joining region of the switching film onto the circumferential mating surface of the first housing section;

wherein the circumferential mating surface of at least one housing section is partially melted onto the joining region of the switching film, integrally connecting the circumferential mating surface to the joining region, wherein the first and second circumferential grooves receive melted material from the joining region and/or the circumferential mating surface.

7. The method according to claim 6, wherein prior to the step of placing the switching film, the method further comprises:
pretreating the joining region by at least one of the methods: etching, plasma treatment, mechanical grinding, embossing or perforation.

8. The method according to claim 6, wherein the at least partially melting step is practiced by any of:
ultrasound melting, or
mirror-imaged welding, or
laser welding, or thermal fusion.

9. The method according to claim 6, wherein after the step of at least partially melting, the method further comprises:
placing the second housing section onto the joining region of the switching film;
pressing the joining region of the switching film against the circumferential mating surface of the second housing section;
at least partially melting the joining region and/or the mating surface of the second housing section to fixedly connect the joining region of the switching film onto the circumferential mating surface of the second housing section.

10. The method according to claim 9, wherein the joining region of the switching film is compressed during the pressing steps of claims 6 and 9 sealing of the regulation housing circumferential mating surfaces to the joining region of the circumferential mating surface.

\* \* \* \* \*